United States Patent
Vargas

(10) Patent No.: US 8,656,971 B2
(45) Date of Patent: Feb. 25, 2014

(54) WHEEL AND MULTI CHAMBER TIRE ASSEMBLY

(76) Inventor: Eladio A. Vargas, Glenview, IL (US)

( * ) Notice: Subject to any disclaimer, the term of this patent is extended or adjusted under 35 U.S.C. 154(b) by 344 days.

(21) Appl. No.: 13/196,476

(22) Filed: Aug. 2, 2011

(65) Prior Publication Data

US 2013/0033095 A1 Feb. 7, 2013

(51) Int. Cl.
*B60C 5/22* (2006.01)

(52) U.S. Cl.
USPC ............... 152/339.1; 152/333.1; 152/379.3; 152/381.4; 301/64.305

(58) Field of Classification Search
USPC ............ 152/331.1, 339.1, 376, 379.3, 381.4, 152/381.5, 381.6, 400, 401, 402, 403, 404, 152/405; 301/64.202, 64.302, 64.305
See application file for complete search history.

(56) References Cited

U.S. PATENT DOCUMENTS

| | | | |
|---|---|---|---|
| 543,862 A | 8/1895 | Gray | |
| 743,309 A * | 11/1903 | Miller | 152/313 |
| 745,040 A | 11/1903 | Cooper | |
| 750,633 A | 1/1904 | Fiske | |
| 782,155 A | 2/1905 | Maxon | |
| 783,793 A * | 2/1905 | Miller | 152/339.1 |
| 837,458 A | 12/1906 | Fairchild | |
| 893,655 A | 7/1908 | Rempes | |
| 1,271,222 A | 7/1918 | Raflovich | |
| 1,335,711 A | 3/1920 | Jakovleff | |
| 1,404,532 A | 1/1922 | Lehr | |
| 1,435,566 A | 11/1922 | Vanderley et al. | |
| 1,488,998 A | 4/1924 | Marshall | |
| 1,679,444 A | 8/1928 | Pagenhart | |
| 1,783,091 A | 11/1930 | Leupold | |
| 1,976,235 A | 10/1934 | Lawrence | |
| 2,027,282 A | 1/1936 | Mason | |
| 2,045,341 A | 6/1936 | Bourdon | |
| 2,045,860 A | 6/1936 | Knapp | |
| 2,052,416 A | 8/1936 | Mills | |
| 2,064,694 A | 12/1936 | Simonds | |
| 2,078,015 A | 4/1937 | Perkins | |
| 2,091,006 A | 8/1937 | Mayne | |
| 2,105,860 A | 1/1938 | Hruska | |
| 2,127,075 A | 8/1938 | Venosta | |
| 2,237,245 A | 4/1941 | Wilson et al. | |
| 2,244,941 A | 6/1941 | Degnon | |

(Continued)

FOREIGN PATENT DOCUMENTS

| | | |
|---|---|---|
| DE | 2008 699 | 9/1971 |
| DE | 24 30 638 | 5/1976 |

(Continued)

*Primary Examiner* — Ruth Ilan
(74) *Attorney, Agent, or Firm* — Lempia Summerfield Katz LLC

(57) ABSTRACT

A tire assembly includes a tire having an annular tread between and connected to outer edges of opposed first and second sidewalls. The first and second sidewalls terminate at radially inner edges defining first and second bead sections, respectively. The tire also has a first interior wall having one edge coupled to the tread and an opposite free edge. The first interior wall is positioned between and generally parallel to and spaced from the first and second sidewalls. A first annular spacer is positionable adjacent the first bead section between the first sidewall and the first interior wall on one side of the first interior wall. A second annular spacer is positionable on the opposite side of the first interior wall. The first and second annular spacers are configured to generally maintain a spacing of the first and second sidewalls and the first interior wall relative to one another.

20 Claims, 8 Drawing Sheets

(56) References Cited

U.S. PATENT DOCUMENTS

| | | |
|---|---|---|
| 2,272,548 A | 2/1942 | Creamer |
| 2,375,127 A | 5/1945 | Mendelsohn |
| 2,415,616 A * | 2/1947 | Wallace .................... 152/339.1 |
| 2,524,808 A | 10/1950 | Khalil |
| 2,525,752 A | 10/1950 | Khalil |
| 2,560,609 A | 7/1951 | Van Hulzen |
| 2,641,295 A | 6/1953 | Des Rosiers |
| 2,664,935 A | 1/1954 | Des Rosiers |
| 2,665,731 A | 1/1954 | Slezak |
| 2,680,463 A | 6/1954 | Khalil |
| 2,713,372 A | 7/1955 | Darrow |
| 2,731,061 A | 1/1956 | Clark |
| 2,874,744 A | 2/1959 | Trainer |
| 2,884,983 A | 5/1959 | Cuesta |
| 2,900,005 A | 8/1959 | Riggs |
| 2,917,096 A | 12/1959 | Snyder |
| 2,934,127 A | 4/1960 | Howard |
| 2,964,084 A | 12/1960 | Tubbs |
| 2,969,824 A | 1/1961 | Howard |
| 2,987,093 A | 6/1961 | Urbon |
| 2,990,869 A | 7/1961 | Riley |
| 3,018,813 A | 1/1962 | Koch et al. |
| 3,025,902 A | 3/1962 | Sanderson |
| 3,059,957 A | 10/1962 | Rasmussen |
| 3,060,990 A | 10/1962 | Howard |
| 3,085,615 A | 4/1963 | Sanderson |
| 3,161,219 A | 12/1964 | Danhi |
| 3,191,654 A | 6/1965 | Anderson et al. |
| 3,195,601 A | 7/1965 | Travers |
| 3,208,497 A | 9/1965 | Schutt |
| 3,219,092 A | 11/1965 | Howard |
| 3,225,811 A | 12/1965 | Hawkes |
| 3,250,310 A | 5/1966 | Johnson |
| 3,318,325 A | 5/1967 | Siedow |
| 3,361,153 A | 1/1968 | Krohn et al. |
| 3,421,535 A | 1/1969 | Hawkes et al. |
| 3,422,836 A | 1/1969 | Hawkes |
| 3,426,821 A | 2/1969 | Boileau |
| 3,476,168 A | 11/1969 | Huber et al. |
| 3,480,064 A | 11/1969 | Huber |
| 3,487,870 A | 1/1970 | Huber |
| 3,496,983 A | 2/1970 | Bartley et al. |
| 3,508,596 A | 4/1970 | Blair |
| 3,509,928 A | 5/1970 | Aghnides |
| 3,542,110 A | 11/1970 | Holl |
| 3,574,317 A | 4/1971 | Brewer |
| 3,724,521 A | 4/1973 | Coddington et al. |
| 3,791,432 A | 2/1974 | Calullerovich |
| 3,814,158 A | 6/1974 | Ryder |
| 3,844,325 A | 10/1974 | Betancourt |
| 3,854,516 A | 12/1974 | Burnell |
| 3,885,614 A | 5/1975 | Fujikawa et al. |
| 3,901,750 A | 8/1975 | Bezbatchenko et al. |
| 3,915,774 A | 10/1975 | Dobson |
| 3,935,892 A | 2/1976 | Arimura et al. |
| 3,945,419 A | 3/1976 | Kosanke |
| 3,949,796 A | 4/1976 | Bartos |
| 3,996,985 A | 12/1976 | Cady et al. |
| 4,003,419 A | 1/1977 | Verdier |
| 4,008,743 A | 2/1977 | Welch |
| 4,153,095 A | 5/1979 | Sarkissian |
| 4,183,388 A | 1/1980 | Cassidy |
| 4,293,017 A | 10/1981 | Lambe |
| 4,295,509 A | 10/1981 | Stein |
| 4,334,565 A | 6/1982 | Stokes |
| 4,418,734 A | 12/1983 | Dobson |
| 4,751,951 A | 6/1988 | Dobson |
| 4,995,438 A | 2/1991 | Weber et al. |
| 5,109,905 A | 5/1992 | Lambe |
| 5,176,764 A | 1/1993 | Abbott et al. |
| 5,301,729 A | 4/1994 | Blair |
| 5,538,061 A | 7/1996 | Blair |
| 5,568,830 A | 10/1996 | Polsinelli et al. |
| 7,882,873 B2 * | 2/2011 | Rubin ............................ 152/165 |
| 2003/0131918 A1 | 7/2003 | Eng |

FOREIGN PATENT DOCUMENTS

| | | |
|---|---|---|
| DE | 25 17 895 | 11/1976 |
| DE | 2902836 | 7/1979 |
| DE | 4200735 | 7/1993 |
| FR | 820 459 | 11/1937 |
| FR | 1.266.629 | 6/1961 |
| FR | 1.279.295 | 11/1961 |
| FR | 1.309.440 | 1/1965 |
| GB | 347690 | 4/1931 |
| GB | 2 252 943 | 8/1992 |
| JP | 2007223477 A * | 9/2007 |

* cited by examiner

WHEEL AND MULTI CHAMBER TIRE ASSEMBLY

BACKGROUND OF THE INVENTION

1. Field of the Disclosure

The present disclosure is generally directed to vehicle tires, and more particularly to a wheel and multi chamber tire assembly for use with a vehicle.

2. Description of Related Art

Pneumatic tires, which are often used in connection with vehicles such as automobiles, trucks, and trailers, are well known in the art. Modern conventional pneumatic tires are tubeless—they do not require an interior or inner tube—and are typically formed of two exterior sidewalls and a tread that define a single interior air chamber. Conventional tires can be problematic in that a single puncture or hole, whether caused by a nail, a rock, a pothole impact, or other object, can deflate, flatten, or, even worse, "blowout" the tire. This may lead to an accident or may, in the least, force the driver to stop driving and change the tire or have the vehicle towed, otherwise risking further damage to the tire, wheel, and/or vehicle structure associated with that tire.

Tires having a single air chamber are also highly susceptible to longitudinal and/or lateral deformation, particularly when the tire is low on air pressure and the vehicle is rounding corners at high speeds or is being driven on rocky, hilly, or generally uneven terrain. This type of unnatural deformation can shorten the lifespan of a conventional tire and also can affect the frame clearance and weight distribution of the vehicle, thereby increasing the likelihood that the driver will later lose control of the vehicle.

In an attempt to overcome some of these above-noted problems, attempts have been made to develop dual-chamber pneumatic tires and tire systems. Typically, these dual chamber systems employ a concentric chamber arrangement in the tire, as disclosed in expired U.S. Pat. No. 5,301,729, in which an inner tire is disposed within an outer tire. The space between the outer tire and the inner tire defines an outer air chamber and the space between the inner tire and the rim defines an inner air chamber. If, due to a puncture or hole, the outer tire is punctured and the outer air chamber deflates, the inner air chamber is intended to remain inflated to prevent a "blowout" or total deflation. Although such a partially inflated tire may provide the driver with some limited control and stability, at least as compared to a conventional single air chamber tire, it is not without problems of its own. The exterior wall of the inner tire is positioned near the inner wall of the outer tire. If the outer tire is punctured and the outer air chamber deflates, the puncturing object and/or the deflating outer tire itself may damage the exterior wall of the inner tire. This may result in a partial, if not full, collapse and deflation of the inner air chamber as well. However, even if the inner air chamber remains intact following the puncture and deflation of the outer air chamber, the tire, now adopting the shape of the inner air chamber, will undergo a significant height (or rolling diameter) reduction. When this happens, that corner of the vehicle will drop to a lower elevation. This can affect weight distribution and may again increase the likelihood that the driver will later lose control of the vehicle. This can also damage the wheel or result in damage to the vehicle parts near the tire.

Some dual chamber systems alternatively employ a side-by-side chamber arrangement. U.S. Publication No. 2003/0131918 discloses a tire in which several air chambers have the same original height and are side by-side adjacent to, but physically separate from, one another. With such an arrangement, even if one of the tire surfaces is punctured and one of the chambers collapses, the vertical elevation of the tire is supposed to remain largely unchanged. Nonetheless, a host of safety issues and potential problems may be associated with the tire disclosed by the '918 publication. For example, once the tire surface is punctured, the corresponding air chamber will collapse or deflate adjacent the other chambers. This can result in width-wise collapse or deformation of the separation wall to the adjacent air chamber, which may deform the other air chambers, side walls, tread surface, and separation walls as it does so. Operating a vehicle with such an irregularly shaped tire may significantly damage the tire, and potentially the wheel, and may also be unsafe. This may be especially true when the vehicle rounds tight corners (where it is important that the tire tread stay flat on the road surface and the side walls hold) or is being driven in less than ideal conditions (such as rain, snow, etc.). Thus, such a side-by-side multi chamber tire design as disclosed in the '918 publication may also be subject to significant lateral and longitudinal deformation when one of the air chambers deflates or blows out. As noted above, this type of deformation may shorten the lifespan of the tire and may affect the ride height and weight distribution of the vehicle. This can increase the likelihood that the driver may lose control of the vehicle.

SUMMARY

In one example according to the teachings of the present invention, a combination wheel and tire assembly has a circular wheel and a circular tire. The circular wheel includes first and second discs and a rim extending in an axial direction between the first and second discs. The circular tire has a tread and first and second sidewalls. The tread has an exterior tread surface and an opposite inner tread surface. The tread connects and extends axially between the first and second sidewalls circumferentially around the circular tire. The first and second sidewalls are seated in the rim adjacent respective first and second rim flanges on the rim. The combination wheel and tire assembly also has an interior wall between and spaced from the first and second sidewalls. The interior wall extends in a radial direction from the inner tread surface to the rim. The combination wheel and tire assembly further includes a first air chamber and a second air chamber. The first air chamber is defined within the first sidewall and the inner tread surface on one side of the interior wall and is radially outward of the rim. The second air chamber is defined within the second sidewall and the inner tread surface on the other side of the interior wall and is radially outward of the rim. The combination wheel and tire assembly further yet includes first and second spacers in the first and second air chambers, respectively, adjacent the rim. The first and second spacers have a circular shape and maintain the spacing of the first sidewall, the interior wall, and the second sidewall relative to one another.

In one example, the first or the second disc can be removable from the rim.

In one example, the first and second spacers can have an annular shape. The first and second air chambers can be formed radially outward of the first and second spacers, respectively.

In one example, the first and second spacers can have a diameter that is larger than a diameter of the rim but is smaller than a diameter of the discs or the first and second rim flanges.

In one example, the combination wheel and tire assembly can include an air flow passageway defined in part by each of the first and second spacers.

In one example, the combination wheel and tire assembly can include an air valve coupled to the rim in fluid communication with an airflow passageway defined in part by each of the first and second spacers. The air valve can be configured to inflate both the first and second air chambers.

In one example, an air flow passageway defined in part by each of the first and second spacers can have holes formed through the respective first and second spacers. The combination can further include an air valve coupled to the rim and an air line in fluid communication with the air valve and the holes.

In one example, the combination wheel and tire assembly can include a second interior wall between and spaced from the interior wall and the second sidewall. The second interior wall can extend in the radial direction from the inner tread surface to the rim. The combination wheel and tire assembly can also include a third air chamber defined radially outward of the rim and within the second sidewall, the second interior wall, and the inner tread surface. The combination wheel and tire assembly further can include a third spacer in the third chamber adjacent the rim. The third spacer can have a circular shape and maintain the spacing of the second interior wall and the second sidewall relative to one another.

In one example according to the teachings of the present invention, a tire assembly includes a tire that has an annular tread between and connected to outer edges of opposed first and second sidewalls. The first and second sidewalls each terminate at radially inner edges defining first and second bead sections, respectively. The tire also has a first interior wall having one edge coupled to the tread and an opposite free edge. The first interior wall is positioned between and generally parallel to and spaced from the first and second sidewalls. The tire assembly further includes a first annular spacer positionable adjacent the first bead section between the first sidewall and the first interior wall on one side of the first interior wall and a second annular spacer positionable on the opposite side of the first interior wall. First and second air chambers can be defined in part by the annular tread, the first and second sidewalls, and the first interior wall radially inward of the tread. The first and second annular spacers are configured to generally maintain a spacing of the first and second sidewalls and the first interior wall relative to one another.

In one example, the tire assembly can include an air flow passageway defined in part by each of the first and second annular spacers.

In one example, an air flow passageway can be defined in part by each of the first and second annular spacers and can include multiple holes formed through and spaced apart and arranged circumferentially around a respective one of the first and second annular spacers. Each air flow passageway can further include a recess on an inner side of the respective one of the first and second annular spacers in fluid communication with each hole of the multiple holes for the respective one of the first and second annular spacers.

In one example, the tire assembly can also include a second interior wall that has one edge coupled to the tread and an opposite free edge. The second interior wall can be positioned between and generally parallel to and spaced from the first interior wall and the second opposed sidewall. The tire assembly can also include a third annular spacer positionable adjacent the second bead section between the second sidewall and the second interior wall, the second annular spacer between the first and second interior walls.

In one example according to the teachings of the present invention, a combination wheel and tire assembly includes a wheel and a tire. The wheel has a first rim flange, a second rim flange, and a rim between the first and second rim flanges. The tire has a tread and first and second sidewalls. The tread has an outer tread surface and an inner surface and connects and extends axially between the first and second sidewalls circumferentially around the tire. The combination also includes a first interior wall and a second interior wall. The first interior wall is spaced from the first sidewall and has an outer end coupled to the inner surface of the tread and an inner end seated in the rim. The second interior wall has an outer end coupled to the inner surface of the tread and an inner end seated in the rim. The second interior wall is positioned between and spaced from the first interior wall and the second sidewall. The combination further includes a first, second, and third air chamber. The first air chamber is defined within the first sidewall, the inner surface of the tread, the first interior wall, and the rim. The second chamber is defined within the inner surface of the tread and the rim and between the first and second interior walls. The third air chamber is defined within the second sidewall, the inner surface of the tread, the second interior wall, and the rim. The combination further includes first, second, and third spacers positioned on the rim within the first, second, and third air chambers, respectively. Each of the first, second, and third spacers extend circumferentially around the rim and maintain a spacing between the first sidewall, the first interior wall, the second interior wall, and the second sidewall.

In one example, the first rim flange can be part of a first disc removably attached to the rim to remove or install one or more of the first, second, and third spacers.

In one example, the first, second, and third spacers can have an annular shape. The first, second, and third spacers can include a plurality of holes formed through and spaced apart circumferentially around the spacer and can have a recess on an inner side of the spacer in fluid communication with the plurality of holes.

In one example, the combination can include a plurality of holes formed through and spaced apart circumferentially around each of the first, second, and third spacers.

In one example, the combination can include a recess on an inner side of each of the first, second, and third spacers. Each recess can be in fluid communication with a plurality of holes formed through and spaced apart circumferentially around each of the first, second, and third spacers, respectively.

In one example, the first and second rim flanges can be an integral part of the wheel and a diameter of the first, second, and third spacers can be expanded to fit over one of the first or second rim flanges and yet fit closely adjacent the rim once over the one rim flange.

In one example, the first, second, and third spacers can each comprise a split ring.

In one example, the first, second, and third spacers can have a diameter that is larger than a diameter of the rim but is smaller than a diameter of the first and second rim flanges.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The present invention is generally directed to a tire assembly and a combination wheel and tire assembly that solves or improves upon one or more of the above noted and/or other problems and disadvantages with known tires and tire and wheel assemblies. The disclosed tire assembly includes a multi-chamber tire having sidewalls and one or more interior walls that define multiple air chambers side-by-side adjacent to, but physically separate from, one another. One or more spacers are positioned or inserted between the sidewalls and the one or more interior walls within the air chambers. Each spacer serves to seal each air chamber and to generally maintain a spacing of and between the sidewalls and the one or more interior walls.

When the tire assembly is mounted to a wheel and used in connection with a vehicle such as an airplane, automobile, truck, trailer, motorcycle, or the like, the combination wheel and tire assembly provides a number of advantages over the prior art. The combination may (i) prevent a single puncture or hole from deflating, flattening, or blowing out the tire, (ii) maintain a height (or rolling diameter) and an elevation of the vehicle when one of the air chambers is punctured, and (iii) reduce lateral deformation of the tire. These advantages may serve to enhance driver control of the vehicle when the tire is punctured, lengthen the lifespan of the tire, increase fuel efficiencies, and prevent damage to the frame and wheel that can occur when tires are punctured. Since the tire is less likely to go flat, using the combination wheel and tire assembly may also obviate a user's need to carry a spare tire in the trunk of the vehicle, saving the user both money (the cost of purchasing and maintaining the spare tire) and trunk space. This also reduces the weight of the vehicle by, for example, 30 to 50 lbs. The weight reduction leads to greater fuel efficiencies. The combination may also be easy to install and repair. The tire and wheel assembly may be easily mounted to or removed from the vehicle. Once the assembly has been removed from the vehicle, the tire may be removed from the wheel using ordinary tools. This allows the user to repair and replace a flat or otherwise defective tire without using special equipment or needing special knowledge or skill These and other objects, features, and advantages of the disclosed tire assembly and combination will become apparent upon reading this disclosure.

Figure 1:
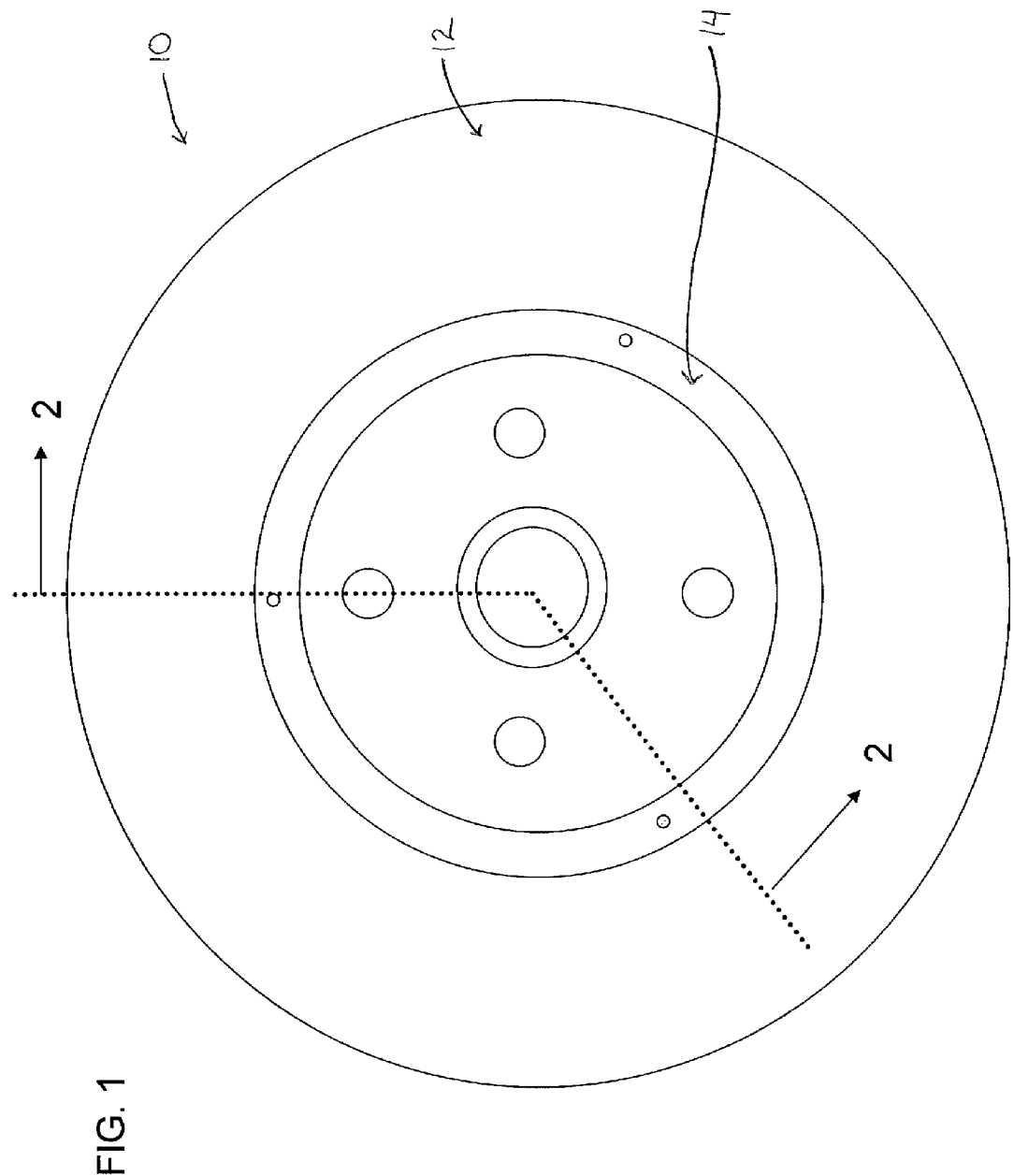
FIG. 1 is a side view of one example of a combination wheel and tire assembly constructed in accordance with the teachings of the present invention.

Turning now to the drawings, FIG. 1 depicts one example of a combination wheel and tire assembly 10 constructed in accordance with the teachings of the present invention. In this example, the combination 10 includes a tire assembly 12 seated on or mounted to a wheel 14. One having ordinary skill in the art will come to realize that the present invention is not limited to this particular combination. In other examples, the tire assembly 12 need not be used in combination or connection with the wheel 14. Instead, the tire assembly 12 can be used in combination with a different wheel and the wheel 14 can be used in combination with a different tire assembly. The tire assembly 12 and/or the wheel 14 can vary in size, shape, configuration, etc., from the example shown.

Figure 2:
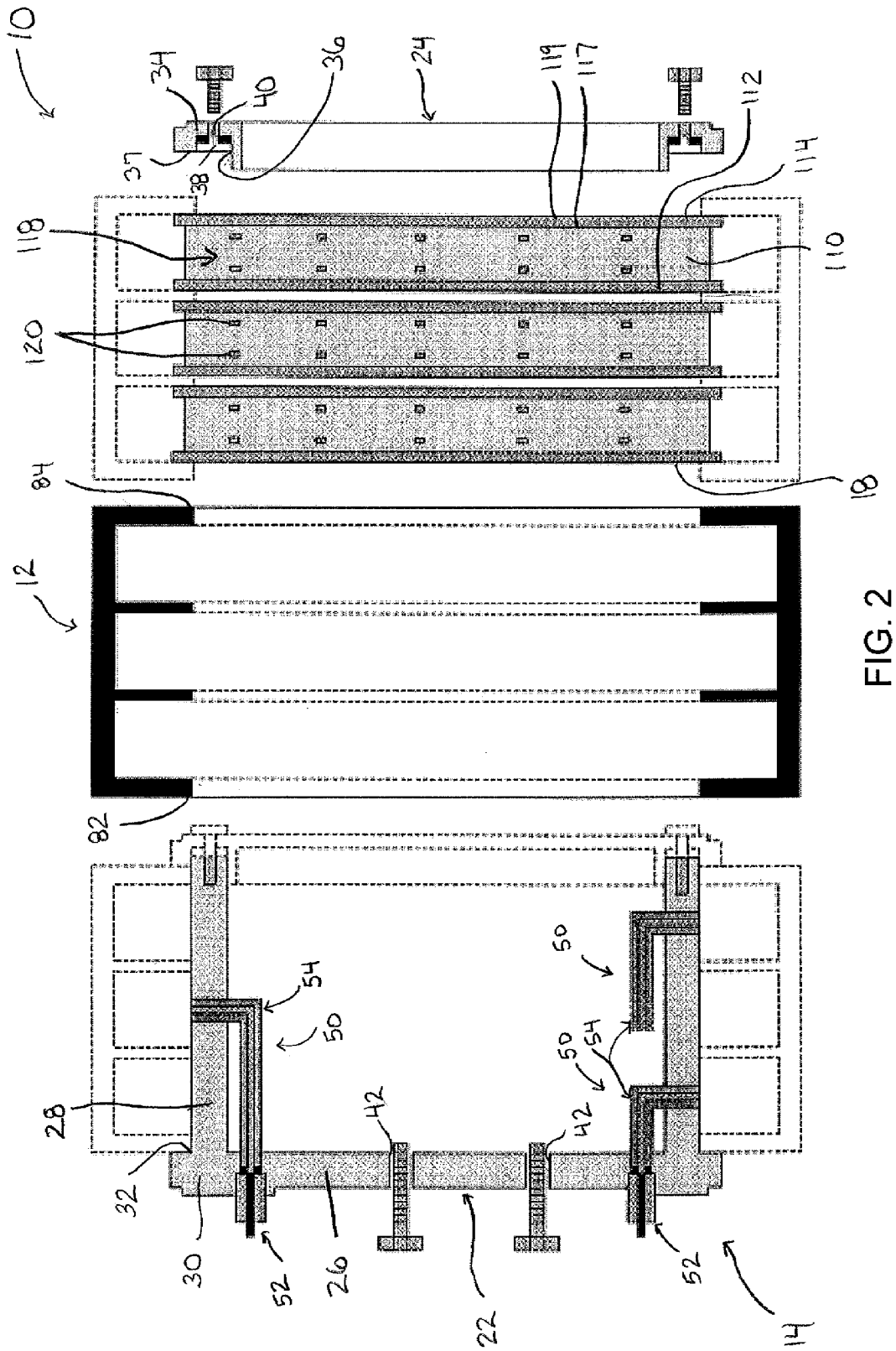
FIG. 2 is an exploded cross-section view taken along line 2-2 of the combination wheel and tire assembly shown in FIG. 1 and in simplified form.
Figure 3:
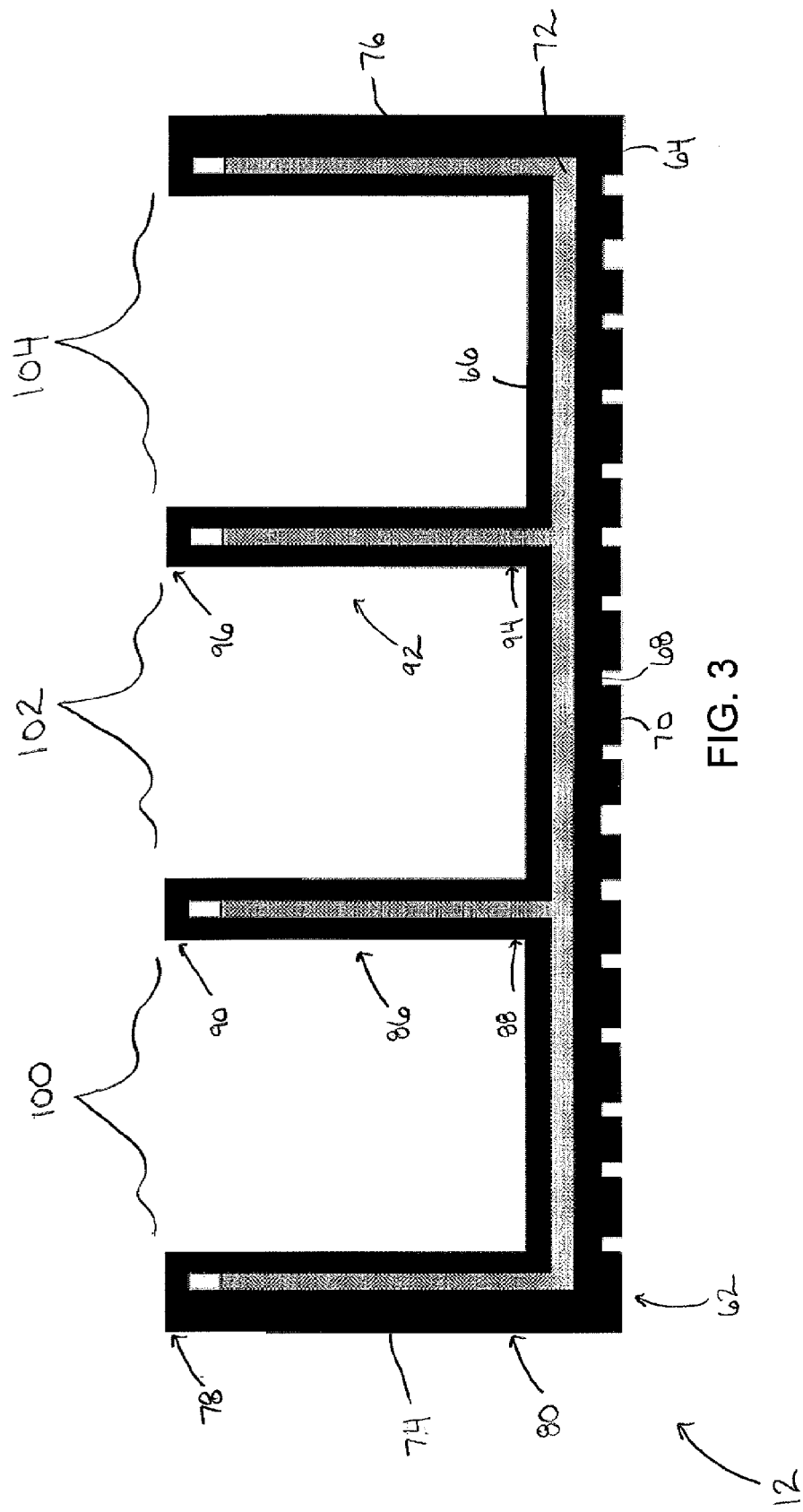
FIG. 3 is a cross-section view of a multi-chamber tire of the combination wheel and tire shown in FIGS. 1 and 2.

FIGS. 2 and 3 depict the components of both the tire assembly 12 and the wheel 14. As is generally known in the art, the wheel 14 is a circular structure mounted to or installed on a hub (not shown) of a vehicle such as an automobile, truck, or trailer. In this example, the tire assembly 12 includes a multi-chamber tire 16 and one or more spacers 18 that can be inserted into or positioned within the chambers of the tire 16 as described below.

In this example, the wheel 14 is a two-piece structure that includes a first section 22 removably coupled or secured to a second section 24. The first section 22 includes a left or outer full face disc 26 integrally connected to an annular rim 28. The disc 26 is on the outward side of the rim 28, relative to a vehicle, when the first and second sections 22 and 24 are connected together and the wheel 14 is mounted to a vehicle. The rim 28 extends laterally in an axially inward direction from the disc 26 toward the vehicle. A first rim flange 30 protrudes radially outward or away from the disc 26 and radially outward of the rim 28 as well. A bead seat 32 (see FIG. 4) is formed and defined by the convergence of the first rim flange 30 and the rim 28 as shown.

Figure 4:
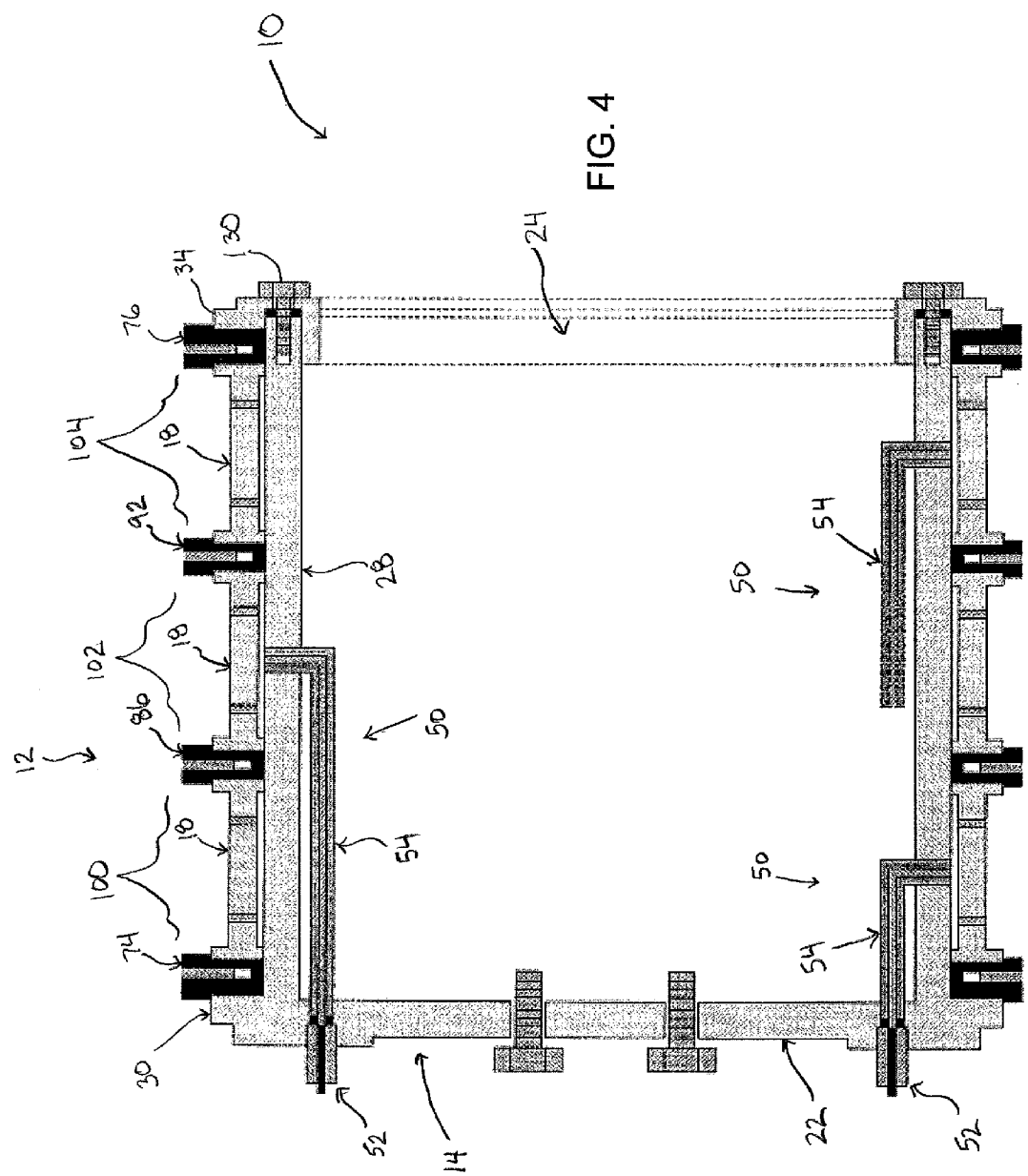
FIG. 4 is a cross-section view of the assembled combination wheel and tire shown in FIGS. 1 and 2.

The second section 24 of the wheel 14 in this example is a generally open face cylindrical or annular disc or ring. The disc or second section 24 is on the inward side of the rim 28, relative to a vehicle, when the first and second sections 22 and 24 are connected together and the wheel 14 is mounted to a vehicle. A second rim flange 34 protrudes radially outward or away from one edge of the second section 24. A bead seat 36 (see FIG. 4) is defined by a rim facing surface 37 of the second rim flange 34 and the rim 28 when assembled. As shown in FIG. 4, the second section 24 further includes an annular channel 38 on the rim facing side of the second rim flange 34 and radially inward of the rim facing surface 37. A plurality of apertures 40 are formed axially through the second section 24 and into the channel 38. A plurality of lug holes 42 are formed through the full face disc 26. The lug holes 42 are for mounting the wheel 14 to a vehicle and the apertures 40 are for attaching the wheel section 24.

Figure 5:
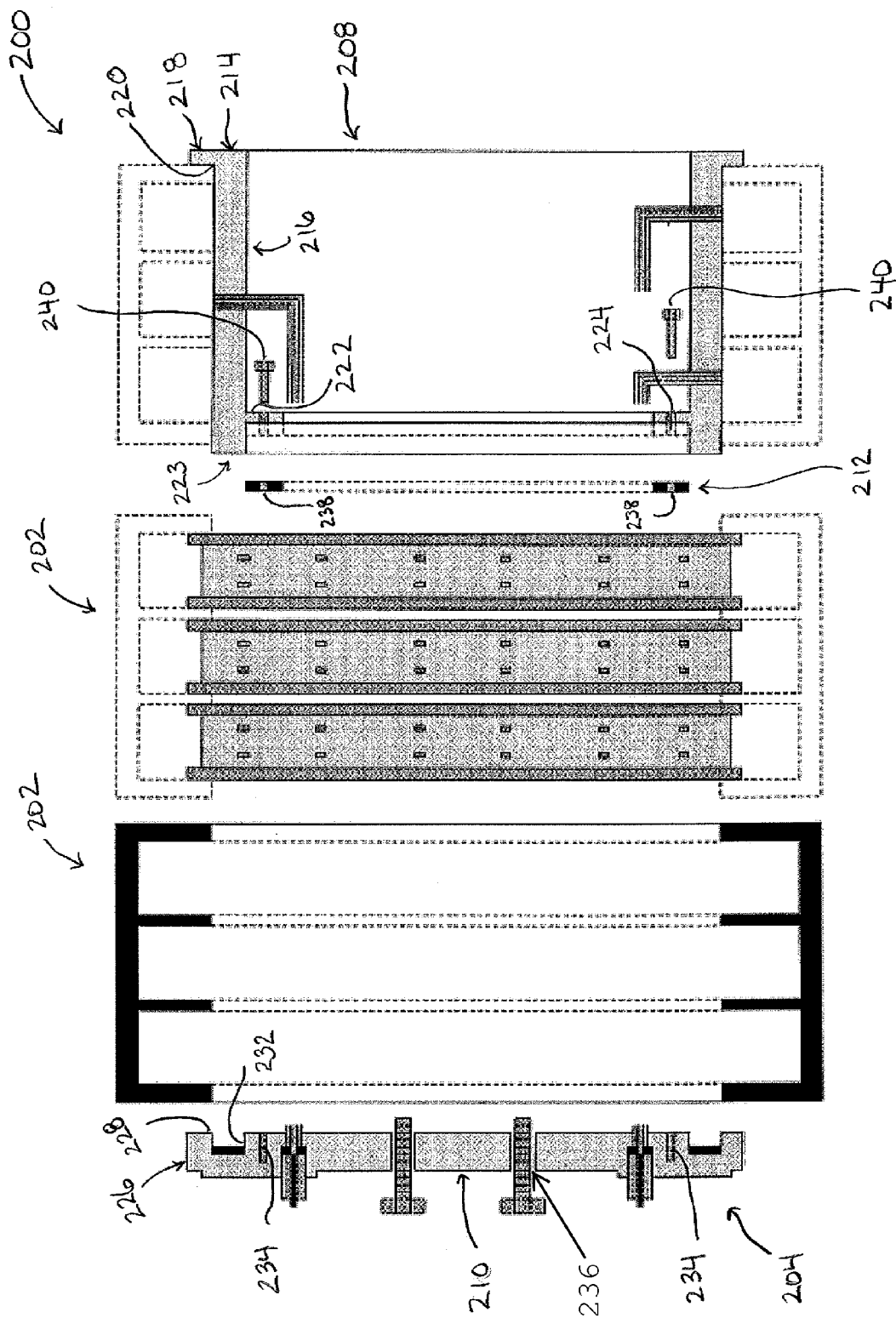
FIG. 5 is a cross-section view of another example of a combination wheel and tire assembly constructed in accordance with the teachings of the present invention.

The wheel 14 further generally includes one or more air valves. In this example, the wheel 14 includes first, second, and third air valves 50 coupled to the first section 22 of the wheel 14. Each air valve 50 includes an air valve stem 52 coupled to or connected to an air valve line 54. The first, second, and third air valve stems 52, only two of which are depicted by FIG. 5, protrude axially outward from the disc 26 of the first section 22 and are configured to receive air from an air pump or other external source. In this example, the three air valve stems 52 (see FIG. 1) are spaced apart and arranged circumferentially around the disc 26. As shown, the first, second, and third air valve lines 54 originate from the first, second, and third air valve stems 52, respectively, travel within and between an interior of the disc 26 and the rim 28, and terminate at different first, second, and third depths across the rim 28, respectively.

With reference to FIG. 3, the components of the multi-chamber tire 16 are illustrated in greater detail. The multi-chamber tire 16 of the tire assembly 12 in this example generally includes an annular tread 62. The tread 62 has an exterior or outer tread surface 64, as is known in the art, and an opposite inner tread surface 66. The exterior tread surface 64 includes a plurality of voids and grooves 68 interposed between a plurality of square or rectangular shaped tread protrusions or lugs 70. The voids, grooves, and protrusions define a tread pattern on the tread surface 64, as is known in the art. The tire 16 in this example also includes a belt or cord 72 encased within the tread 62 between the outer and inner tread surfaces 64, 66. The belt 72, as is known in the art, is configured to restrict unnatural deformation in the lugs 70 and enhance the puncture strength of the tread 62 and, more generally, the tire 16.

Known belts or cords are often made of a steel mesh material. The belt or cord 72 in this example is made of a strong but flexible fiber mesh such as Kevlar. The tire 16 is thus less stiff and more flexible, such that it produces a softer and less noisy ride. As a result of the enhanced flexibility of the tire 16, the tire consumes less energy, which results in fuel savings, and can be made of a thicker material, which increases the longevity and lifetime mileage of the tire. Of course, in other examples, the belt 72 can be made of a rubber, steel, or other suitable material.

The tire 16 also generally includes opposed first and second sidewalls 74, 76. In this example, the first and second sidewalls 74, 76 are oriented vertically, generally parallel to one another and generally perpendicular to the tread 62, in the radial direction from an inner edge 78 to an outer edge 80. The inner edge 78 of the first and second sidewalls 74, 76 defines first and second bead sections 82, 84, respectively, as shown in FIG. 2. The outer edge 80 of the first and second sidewalls 74, 76 is connected to opposed edges of the tread 62 such that the tread 62 extends axially between the first and second sidewalls circumferentially around the tire 16.

In this example, the multi-chamber tire 16 has a first interior wall 86. The interior wall 86 is positioned between, spaced from, and generally parallel to the first and second sidewalls 74, 76. The interior wall 86 has one edge or end 88 coupled or attached to the tread 62, particularly the inner tread surface 66, and a free edge or end 90 opposite the attached edge 116.

The tire 16 in this example further includes a second interior wall 92 positioned between the first and second sidewalls 74, 76 axially outward (toward the first rim section 22) of the first interior wall 86. The result is that the second interior wall 92 is positioned between and spaced from the first interior wall 86 and the second sidewall 76 as shown. Like the interior wall 86, the second interior wall 92 has one edge or end 94 coupled or attached to the tread 62, particularly the inner tread surface 66, and a free edge or end 96 opposite the attached edge 94.

In other examples, one or more of the first and the second sidewalls 74, 76, the first interior wall 86, and the second interior wall 92 can be spaced, arranged, or oriented differently relative to one another or to the tread 62. The first and second sidewalls 74, 76, the interior wall 86, and the interior wall 92 can also be connected or coupled to different parts or at different locations on the tire 16. In another example, the tire 16 can have only one interior wall—the first interior wall 86—and not the second interior wall 92. In other examples, the tire 16 can include more than two interior walls, depending upon the purpose of the vehicle and the function and/or size of the tire 16.

The tire 16 of the tire assembly 12 generally includes two or more air chambers separated by the one or more interior walls. As shown in FIG. 3, the tire 16 in this example includes first, second, and third air chambers 100, 102, and 104 defined and separated by the first and second interior walls 86, 92 and located radially inward of the tread 62 and radially outward of the rim 28 when the wheel 14 is attached (see FIG. 4). The air chambers 100, 102, and 104 are thus generally defined, at least in part, by the inner tread surface 66 of the tread 62, the first and second sidewalls 74, 76, and the first and second interior walls 86, 92. More specifically, the first air chamber 100 is defined within the first sidewall 74, the first interior wall 86, and the inner tread surface 66. The second air chamber 102 is defined between the first interior wall 86 and the second interior wall 92 within the inner tread surface 66. The third chamber 104 is defined within the second sidewall 76, the inner tread surface 66, and the second interior wall 92.

In other examples, though, the first, second, and third air chambers can be arranged in a different manner. More fundamentally, one of ordinary skill in the art will come to realize that the tire 16 need not include three air chambers, as it may alternatively include only the first and second air chambers 100, 102, or could include more than three air chambers, depending upon the size of the tire 16 and the number and arrangement of interior walls within the tire 16.

With reference again to FIG. 2, the tire assembly 12 generally includes one or more spacers 18. In this example, the tire assembly 12 includes three spacers 18. Each spacer 18 in this example has a generally annular or circular shape and has a diameter larger than a diameter of the rim 28 but one that is smaller than a diameter of the first and second sections 22, 24 and/or the first and second rim flanges 30, 34. Thus, when the wheel and tire are assembled, the spacers 18 will be captured axially between the rim flanges 30, 34. As shown in FIG. 4, each spacer 18 includes an annular ring or body 110 positioned between a pair of edges or flanges 112, 114. Each edge flange 112, 114 extends circumferentially around the spacer 18. Each edge flange 112, 114 also is oriented normal or perpendicular to the body or ring 110 and is wider than the body is thick (see FIG. 4). Each edge flange also has a radially inward surface 117 and a radially outward surface 119.

In this example, the tire assembly 12 further includes an air flow passageway 118 between each spacer 18 and the rim 28. A plurality of holes 120 are formed through and spaced and arranged apart circumferentially around each spacer ring or body 110. Each spacer 18, when installed on the rim 28, has an inner side 122 of the body 110 facing and spaced away from the rim. The spacer 18 rests on the radially inner surfaces 117 of the edge flanges 112, 114. The passageway 118 is defined in the gap between the inner side 122 of the spacer 18 and the rim 28, and between the edge flanges 112, 114. The passageway 118 is in fluid communication with each hole 120.

In this example, each of the first, second, and third spacers 18 can be made of any suitably rigid or semi-rigid material, such as steel, aluminum, plastic, composite, or the like. The diameter of the first, second, and third spacers 18 is sized to closely fit over the rim 28 before assembling the removable open face disc or ring 24 in this example. The edge flanges 112, 114 set the ring or body 110 of the spacers spaced from the rim 28 to create the air passageways 118.

Moreover, the spacers 18 need not include the passageways 118 in other examples. Alternatively, the air flow passageways 118 may, in other alternate examples, be designed differently. The holes 120 can also be formed through and/or spaced along the spacer 18 in a different manner. For example, the holes 120 can be formed through the spacer 18 at a position closer to the edge flanges 112, 114. Likewise, the edge flanges 112, 114 can be positioned differently relative to the body 110 of the spacer 18 and still communicate with the holes 120.

FIG. 4 illustrates the components of the tire assembly 12 and the wheel 14, described above, assembled to produce the combination wheel and tire assembly 10. To reach the assembled configuration shown in FIG. 4, the second section 24 is detached from the inner edge of the rim 28. The first, second, and third spacers 18 are slipped over an exposed inner edge of the rim 28 of the first section 22 of the wheel simultaneously with the multi-chamber tire 16. The spacers 18 can be positioned between the appropriate walls of the tire 16 and then the tire and spacers can be slipped onto the rim in the appropriate sequence. The second section 24 of the wheel 14 is then attached or secured to the first section 22 by inserting a bolt 130 into each of the plurality of apertures 40 (see FIG. 2). The second section 24 of the wheel 14 can, of course, be removed or detached from the first section 22 in a similar manner. This permits the easy installation or removal of the tire 16 and the two or more spacers 18 from the rim 28.

One having ordinary skill in the art will realize that the components of the combination 10 can be assembled in a different manner. For example, the first, second, and third spacers 18 can be sequentially inserted into the specific chamber of the multi-chamber tire 16, at the point and time where the appropriate side or inner wall of that chamber of the tire 16 contacts the rim 28 of the first section 22 of the wheel 14.

Once the combination 10 in this example is assembled, the first bead section 82 of the first sidewall 74 is seated within the bead seat 32 closely adjacent the first rim flange 30 and the flange 112 of the first spacer 18. The first interior wall 86, and more particularly, the free edge 90, is seated or positioned on the rim 28 between or closely adjacent the edge flanges 112, 114 of the first and the second spacers 18, respectively. The second interior wall 92, and more particularly, the free edge 96, is seated or positioned on the rim 28 between or closely adjacent the edge flanges 112, 114 of the second and third spacers 18, respectively. In this example, the second bead section 84 of the second sidewall 76 is seated within the bead seat 36 closely adjacent the second rim flange 34 and the edge flange 114 of the third spacer 18.

In the example depicted by FIG. 4, the first spacer 18 is positioned or located against the rim 28 within the first air chamber 100, the second spacer 18 is positioned or located against the rim within the second air chamber 102, and the third spacer 18 is positioned or located against the rim within the third air chamber 104. In this arrangement, the first, second, and third spacers 18 exert significant transverse or side-to-side pressure on one another, the first and second sidewalls 74, 76, the first and second interior walls 86, 92, and the rim 28, particularly the first and second rim flanges 30, 34. Accordingly, the first, second, and third spacers 18 hold the components of the combination 10 tightly in place across the width of the rim 28 between the rim flanges 30, 34. As shown in FIG. 4, the first, second, and third spacers 18 maintain a spacing S of and between the first and second sidewalls 74, 76 and the first and second interior walls 86, 92 relative to one another. Lateral migration, drifting, and/or movement of these walls is thus reduced or prevented. Such an arrangement also prevents air from leaking out of the tire 16.

As shown in FIG. 4, the first, second, and third air valves 50, via their respective air lines 54, are in fluid communication with the passageways 118 and the plurality of holes 120 of the first, second, and third spacers 18, respectively. As a result, the first, second, and third air chambers 100, 102, and 104 can be independently inflated via air supplied into the each of the respective air valve stems 52. To inflate the first air chamber 100, for example, the external air source or pump can be connected to the air valve stem 52 that corresponds to the first air chamber 100. After air is pumped into the air valve stem 52, the air travels through the corresponding air line 54 and the passageway 118 and the holes 120 until it reaches the first chamber 100. In this example, the same process can be followed to inflate the second and third air chambers 102, 104. Accordingly, the air pressure in each air chamber 100, 102, and 104 can be independent of the air pressure in the other air chambers 100, 102, and 104. The combination of the air valves, stems, air lines, passageways, and holes for each air chamber defines an air flow path to fill each chamber separately in this example.

FIG. 5 depicts another example of a combination wheel and tire assembly 200 constructed in accordance with the teachings of the present invention. In this example, the combination 200 includes a tire assembly 202 seated on or mounted to a wheel 204. The tire assembly 202 is, in this example, has the same components as the tire assembly 12. The wheel 204, like the previously described wheel 14, is a circular structure mounted to or installed on a hub (not shown) of a vehicle such as an automobile, truck, or trailer. Unlike the wheel 14, the wheel 204 has an alternate first section 208 removably coupled or secured to an alternate second section 210.

The first section 208 includes a generally hollow cylindrical or annular disc or ring 214 integrally connected to an annular rim 216. The integral disc 214 is an open face disc and is on the inward side of the rim 216, relative to a vehicle, when the sections 208, 210 are connected together and the wheel 204 is mounted to a vehicle. The rim 216 extends in an axially outward direction from the integral disc 214 away from the vehicle. A first rim flange 218 protrudes radially outward or away from the disc 214 and radially outward of the rim 216 as well. A bead seat 220 is formed and defined by the convergence of the first rim flange 218 and the rim 216 as shown. The first section 208 further includes an annular shoulder 222 that protrudes radially inward around the rim 216 near but spaced axially from an outer end 223 of the rim 216 opposite the integral disc end. The first section 208 also includes a plurality of apertures 224 formed axially through and spaced circumferentially around the shoulder 222 as shown.

The second section 210 in this example is a left or outer full face disc. The disc or section 210 is on the outward side of the rim 216, relative to a vehicle, when the wheel sections 208, 210, are connected together and the wheel 204 is mounted to a vehicle. A second rim flange 226 is defined by the radially outward most edge of the disc 210. A bead seat 228 is defined by a rim facing surface 230 of the second rim flange 226 and the rim 216 when assembled. As shown in FIG. 5, the second section 210 further includes an annular channel 232 on the rim facing side of the second rim flange 226 and recessed into the rim facing surface 230. A plurality of apertures 234 are formed axially through the disc 210 at a position radially inward of the channel 232. The apertures 234 have the same width as and are concentrically aligned with the apertures 224. A plurality of lug holes 236 are formed through the full face disc 210. The lug holes 236 are for mounting the wheel 204 to a vehicle and the apertures 234 are for attaching the wheel section 210 to the sections 208, 212.

A gasket 212 in this example has a thin and generally cylindrical or annular shape. The gasket 212 includes a plurality of apertures 238 that are concentrically aligned with the apertures 224, 234, as shown. When the wheel 204 is completely assembled, the gasket 212 provides a seating surface between the first and second sections 208, 210 for the wheel 204.

The first, second, and third sections 208, 210 of the wheel 204 can be assembled as follows. In this example, the second section or disc 210 is attachable to the first section 208. A bolt 240 is inserted into each of the plurality of concentrically aligned apertures 224, 238 of the first section 208 and the gasket 212, respectively. When the second section 210 is adjacent or near the first section 208 and the gasket 212, the second section 210 can be attached or secured to the first section 208 by inserting an outward end of the rim 216 into the channel 232 and by further inserting the bolts 240 into each of the plurality of apertures 234, which, as shown in FIG. 5, are also aligned with a corresponding pair of the plurality of apertures 224, 238. Using the same steps, albeit in reverse order, the section or disc 210 can be removed from the first section 208.

One of ordinary skill in the art will come to realize that the wheels 14 and 204 can be constructed differently and yet still fall within the teachings of the present invention. In other examples, the first and second sections 22, 24 of the wheel 14 and the first and second sections 208, 210 of the wheel 204 can also be partitioned differently or connected to one another in a different manner or at a different location than described. Of course, any of these components can have a different shape and/or size than the components of the wheels 14 and 204 described herein.

In other examples, the spacers 18 can be configured differently, have a different size, width and/or shape, and/or be made of a different material, such as plastic, metal, or the like, than the spacers described herein. For example, the spacer 18 can be made of an elastic material. This would permit a diameter of the first, second, and third spacers to be expanded to fit over one of the first or second rim flanges and yet fit closely adjacent the rim once over the one rim flange. In another example, the spacers 18 can have a clamp that, when released, allows the spacer 18 to be positioned on or removed from the rim, and, when engaged, secures the spacer 18 to the rim. In yet another example, the width of the spacers 18 can be adjusted. This would permit the spacer 18 to be used in connection with many different types (e.g., widths) of tires.

Figure 6:
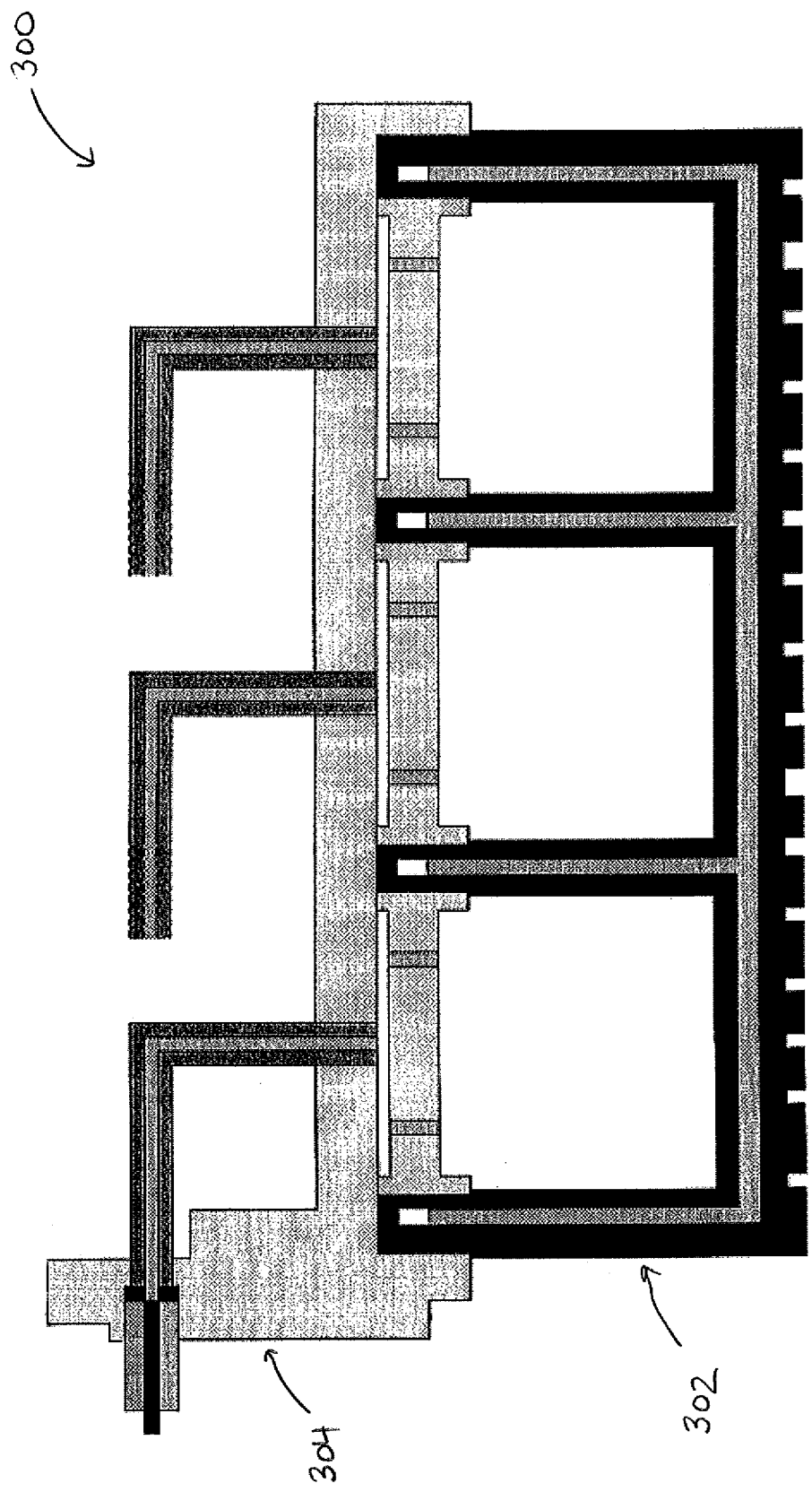
FIG. 6 is a cross-section view of another example of a combination wheel and tire assembly constructed in accordance with the teachings of the present invention.

In other examples, the rims 14 and 204 need not include two or three detachable or removable components. FIG. 6, for example, depicts an alternative wheel and tire assembly 300 in which a tire assembly 302 is mounted or seated on an alternate wheel 304. In this example, the tire assembly 302 is the same as the tire assembly 12, but the wheel 304 is a one-piece structure. The discs or sections, rim flanges, and bead seats of the wheel 304 are thus integrally connected with one another as shown.

In these examples, the wheels 14, 204, and 304 are manufactured using steel. In other examples, the wheels 14, 204, and 304 can be made of chrome, magnesium alloy, aluminum alloy, some other type of metal, or the like, depending on the driver's cost and vehicle handling preferences.

Figure 7:
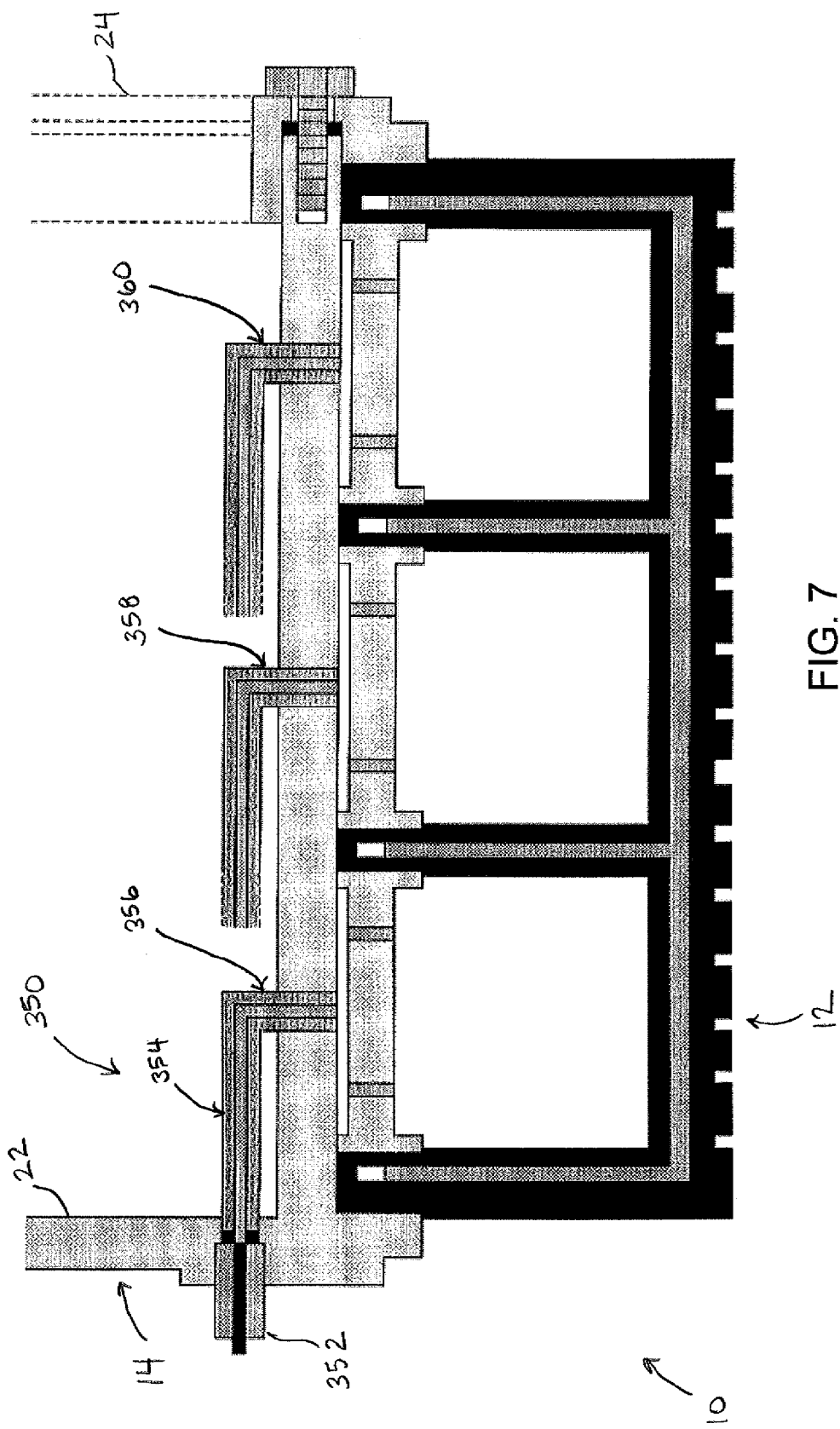
FIG. 7 is a cross-section view of another example of a combination wheel and tire assembly constructed in accordance with the teachings of the present invention.

FIG. 7 illustrates another example of an inflation system (as does FIG. 6) that can be used in connection with the combinations 10, 200, and 300. In this example, the inflation system is installed on or used with the combination 10. In this example, the wheel 14 includes an air valve 350 coupled to the first section 22 of the wheel 14. The air valve 350 includes an air valve stem 352 coupled to or connected to a valve line 354. As shown in FIG. 7, the air valve stem 352 protrudes axially outward from the disc 26 of the first section 22 and is configured to receive air from an air pump or other external source. In this example, the air valve line 354 originates from the air valve stem 352, travel within and between an interior of the disc 26 and the rim 28, and splits into first, second, and third air line branches 356, 358, and 360. The first, second, and third air line branches 356, 358, and 360 terminate at or into the first, second, and third air chambers 100, 102, and 104, respectively. The lone air valve stem 352 and the valve line 354, and each of the air line branches 356, 358, and 360 are thus in fluid communication with the passageways 118 and holes 120 of the first, second, and third spacers 18, respectively. When air is forced into the lone air valve stem 352, the air travels along the air valve line 354 and further travels into the air line branch or path having the least resistance (in other words, the path corresponding to the chamber having the lowest air pressure). This occurs until the first, second, and third air chambers 100, 102, and 104 are each completely inflated. The inflation system and air flow path in this example thus permits inflation of the air chambers 100, 102, and 104 using just one air valve.

One of ordinary skill in the art will come to realize that alternative inflation systems and air flow paths can be used in connection with the combinations 10, 200, and 300. In other examples, the air valve stems and the air valve lines can be connected or coupled and/or arranged relative to the wheel, to one another, or to the tire. In other examples, a different number of air valve stems and/or air valve lines can be used, depending on the number of air chambers.

Figure 8:
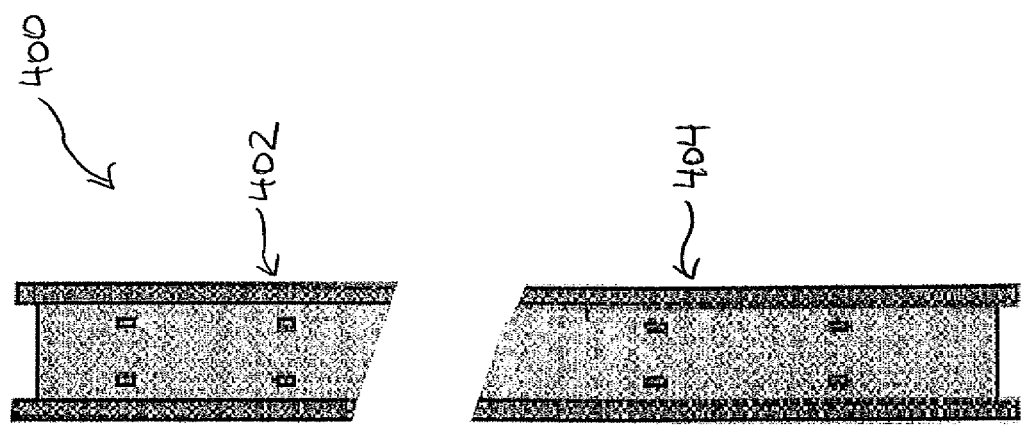
FIG. 8 is an end view of another example of tire spacers constructed in accordance with the teachings of the present invention.

FIG. 8 illustrates another example of a tire spacer 400 constructed in accordance with the teachings of the present invention. One or more tire spacers 400 can be utilized instead of, or in addition to, the spacers 18 in the combinations 10, 200, and 300. In this example, the spacer 400 is a generally annular or circular split-ring. As shown in FIG. 8, the split ring spacer 400 includes two free ends 402, 404 that can be split apart. The spacers can be expanded to fit over an integral rim flange (such as in FIG. 6) and will then return to fit closely to the rim. This allows the split ring spacer 400 to be installed to or removed from components of the combinations 10, 200, and 300 independently of one another or at the same time and with or without having to remove one of the rim flanges.

The annular gasket 212 can, in an alternate example, be used in either or both of the channels 38, 232 of the removable discs or sections 24, 210, respectively, to abut the end of the respective rims 28, 216 (see FIGS. 3, 5, and 7).

Although a tire assembly and a combination rim and tire assembly have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:
1. A combination wheel and tire assembly comprising:
a circular wheel having first and second discs and a rim extending in an axial direction between the first and second discs;
a circular tire having a tread and first and second sidewalls, the tread having an exterior tread surface and an opposite inner tread surface and connecting and extending axially between the first and second sidewalls circumferentially around the circular tire, and the first and second sidewalls seated in the rim adjacent respective first and second rim flanges on the rim;
an interior wall between and spaced from the first and second sidewalls and extending in a radial direction from the inner tread surface to the rim;
a first inflatable air chamber extending circumferentially around and within the circular tire and defined within the first sidewall and the inner tread surface on one side of the interior wall and radially outward of the rim;
a second inflatable air chamber extending circumferentially around and within the circular tire and defined within the second sidewall and the inner tread surface on the other side of the interior wall and radially outward of the rim; and
first and second spacers in the first and second air chambers, respectively, adjacent the rim, the first and second spacers having a circular shape and maintaining the spacing of the first sidewall, the interior wall, and the second sidewall relative to one another.

2. The combination of claim 1, wherein the first or the second disc is removable from the rim.

3. The combination of claim 1, wherein the first and second spacers have an annular shape and wherein the first and second inflatable air chambers are formed radially outward of the first and second spacers, respectively.

4. The combination of claim 1, wherein the first and second spacers have a diameter that is larger than a diameter of the rim but is smaller than a diameter of the discs or the first and second rim flanges.

5. The combination of claim 1, further comprising an air flow path to each of the first and second inflatable air chambers and including a passageway defined in part by each of the first and second spacers.

6. The combination of claim 5, further comprising an air valve coupled to the rim in fluid communication with the air flow path of each of the first and second inflatable air chambers and configured to inflate both the first and second inflatable air chambers.

7. The combination of claim 1, further comprising:
a second interior wall between and spaced from the interior wall and the second sidewall and extending in the radial direction from the inner tread surface to the rim;
a third inflatable air chamber defined radially outward of the rim channel and within the second sidewall, the second interior wall, and the inner tread surface; and
a third spacer in the third chamber adjacent the rim channel, the third spacer having a circular shape and maintaining the spacing of the second interior wall and the second sidewall relative to one another.

8. A combination wheel and tire assembly comprising:
a circular wheel having first and second discs and a rim extending in an axial direction between the first and second discs;
a circular tire having a tread and first and second sidewalls, the tread having an exterior tread surface and an opposite inner tread surface and connecting and extending axially between the first and second sidewalls circumferentially around the circular tire, and the first and second sidewalls seated in the rim adjacent respective first and second rim flanges on the rim;
an interior wall between and spaced from the first and second sidewalls and extending in a radial direction from the inner tread surface to the rim;
a first air chamber defined within the first sidewall and the inner tread surface on one side of the interior wall and radially outward of the rim;
a second air chamber defined within the second sidewall and the inner tread surface on the other side of the interior wall and radially outward of the rim;
first and second spacers in the first and second air chambers, respectively, adjacent the rim, the first and second spacers having a circular shape and maintaining the spacing of the first sidewall, the interior wall, and the second sidewall relative to one another; and
an air flow path to each of the first and second air chambers and including a passageway defined in part by each of the first and second spacers,
wherein each passageway of the first and second spacers is in fluid communication with holes formed through the respective first and second spacers, and the air flow path has an air line in fluid communication with an air valve and the holes.

9. A multi-chamber tire assembly comprising:
a tire having an annular tread between and connected to outer edges of opposed first and second sidewalls, the first and second sidewalls terminating at radially inner edges defining first and second bead sections, respectively;
a first interior wall having one edge coupled to the tread and an opposite free edge, the first interior wall positioned between and generally parallel to and spaced from the first and second sidewalls;
a first annular spacer positionable adjacent the first bead section between the first sidewall and the first interior wall on one side of the first interior wall;
a second annular spacer positionable on the opposite side of the first interior wall; and
first and second inflatable air chambers defined in part by the annular tread, the first and second sidewalls, and the first interior wall, the first and second inflatable air chambers extending circumferentially around the tire radially inward of the tread,
wherein the first and second annular spacers are configured to generally maintain a spacing of the first and second sidewalls and the first interior wall relative to one another.

10. The multi-chamber tire assembly of claim 9, further comprising an air flow path to the first and second inflatable air chambers and including a passageway defined in part by each of the first and second annular spacers.

11. The multi-chamber tire assembly of claim 9, further comprising:
a second interior wall having one edge coupled to the tread and an opposite free edge, the second interior wall positioned between and generally parallel to and spaced from the first interior wall and the second sidewall; and
a third annular spacer positionable adjacent the second bead section between the second sidewall and the second interior wall,
wherein the second annular spacer is positionable between the first and second interior walls.

12. A multi-chamber tire assembly comprising:
a tire having an annular tread between and connected to outer edges of opposed first and second sidewalls, the first and second sidewalls terminating at radially inner edges defining first and second bead sections, respectively;
a first interior wall having one edge coupled to the tread and an opposite free edge, the first interior wall positioned between and generally parallel to and spaced from the first and second sidewalls;
a first annular spacer positionable adjacent the first bead section between the first sidewall and the first interior wall on one side of the first interior wall;
a second annular spacer positionable on the opposite side of the first interior wall;
first and second air chambers defined in part by the annular tread, the first and second sidewalls, and the first interior wall, the first and second air chambers radially inward of the tread; and
an air flow path to the first and second air chambers and including a passageway defined in part by each of the first and second annular spacers,
wherein the first and second annular spacers are configured to generally maintain a spacing of the first and second sidewalls and the first interior wall relative to one another, and
wherein the air flow path includes multiple holes formed through and spaced apart and arranged circumferentially around each of the first and second annular spacers, and each of the multiple holes through each of the first and second annular spacers in fluid communication with the corresponding passageway of the first and second annular spacers.

13. A combination wheel and tire assembly comprising:
a wheel having a first rim flange, a second rim flange, and a rim between the first and second rim flanges;
a tire having a tread and first and second sidewalls, the tread having an outer tread surface and an inner surface and connecting and extending axially between the first and second sidewalls circumferentially around the tire;
a first interior wall spaced from the first sidewall and having an outer end coupled to the inner surface of the tread and an inner end seated in the rim;
a second interior wall having an outer end coupled to the inner surface of the tread and an inner end seated in the rim, the second interior wall positioned between and spaced from the first interior wall and the second sidewall;
a first air chamber defined within the first sidewall, the inner surface of the tread, the first interior wall, and the rim;
a second air chamber defined within the inner surface of the tread and the rim and between the first and second interior walls;
a third air chamber defined within the second sidewall, the inner surface of the tread, the second interior wall, and the rim, the first, second, and third air chambers inflatable and deflatable independently of one another; and
first, second, and third spacers positioned on the rim within the first, second, and third air chambers, respectively, and extending circumferentially around the rim,
wherein the first, second, and third spacers maintain a spacing between the first sidewall, the first interior wall, the second interior wall, and the second sidewall.

14. The combination of claim 13, wherein the first rim flange is part of a first disc and is removably attached to the rim to remove or install one or more of the first, second, and third spacers.

15. The combination of claim 13, wherein the first, second, and third spacers have an annular shape, each spacer having a plurality of holes formed through and spaced apart circumferentially around the respective spacer and in fluid communication with a corresponding passageway defined between the respective spacer and the rim.

16. The combination of claim 13, wherein the first, second, and third spacers have a diameter that is larger than a diameter of the rim but smaller than a diameter of the first and second rim flanges.

17. A combination wheel and tire assembly comprising:
a wheel having a first rim flange, a second rim flange, and a rim between the first and second rim flanges;
a tire having a tread and first and second sidewalls, the tread having an outer tread surface and an inner surface and connecting and extending axially between the first and second sidewalls circumferentially around the tire;
a first interior wall spaced from the first sidewall and having an outer end coupled to the inner surface of the tread and an inner end seated in the rim;
a second interior wall having an outer end coupled to the inner surface of the tread and an inner end seated in the rim, the second interior wall positioned between and spaced from the first interior wall and the second sidewall;
a first air chamber defined within the first sidewall, the inner surface of the tread, the first interior wall, and the rim;
a second air chamber defined within the inner surface of the tread and the rim and between the first and second interior walls;
a third air chamber defined within the second sidewall, the inner surface of the tread, the second interior wall, and the rim;
first, second, and third spacers positioned on the rim within the first, second, and third air chambers, respectively, and extending circumferentially around the rim; and
a plurality of holes formed through and spaced apart circumferentially around each of the first, second, and third spacers,
wherein the first, second, and third spacers maintain a spacing between the first sidewall, the first interior wall, the second interior wall, and the second sidewall.

18. The combination of claim 17, further comprising a passageway defined between an inner side of each of the first, second, and third spacers, respectively, and the rim, each passageway in fluid communication with the plurality of holes of a respective one of the first, second, and third spacers.

19. A combination wheel and tire assembly comprising:
a wheel having a first rim flange, a second rim flange, and a rim between the first and second rim flanges;
a tire having a tread and first and second sidewalls, the tread having an outer tread surface and an inner surface and connecting and extending axially between the first and second sidewalls circumferentially around the tire;
a first interior wall spaced from the first sidewall and having an outer end coupled to the inner surface of the tread and an inner end seated in the rim;
a second interior wall having an outer end coupled to the inner surface of the tread and an inner end seated in the rim, the second interior wall positioned between and spaced from the first interior wall and the second sidewall;
a first air chamber defined within the first sidewall, the inner surface of the tread, the first interior wall, and the rim;
a second air chamber defined within the inner surface of the tread and the rim and between the first and second interior walls;
a third air chamber defined within the second sidewall, the inner surface of the tread, the second interior wall, and the rim; and
first, second, and third spacers positioned on the rim within the first, second, and third air chambers, respectively, and extending circumferentially around the rim,
wherein the first, second, and third spacers maintain a spacing between the first sidewall, the first interior wall, the second interior wall, and the second sidewall, and
wherein the first and second rim flanges are an integral part of the wheel and a diameter of the first, second, and third spacers can be expanded to fit over one of the first or second rim flanges and yet fit closely adjacent the rim once over the one rim flange.

20. A combination wheel and tire assembly comprising:
a wheel having a first rim flange, a second rim flange, and a rim between the first and second rim flanges;
a tire having a tread and first and second sidewalls, the tread having an outer tread surface and an inner surface and connecting and extending axially between the first and second sidewalls circumferentially around the tire;
a first interior wall spaced from the first sidewall and having an outer end coupled to the inner surface of the tread and an inner end seated in the rim;
a second interior wall having an outer end coupled to the inner surface of the tread and an inner end seated in the rim, the second interior wall positioned between and spaced from the first interior wall and the second sidewall;

a first air chamber defined within the first sidewall, the inner surface of the tread, the first interior wall, and the rim;

a second air chamber defined within the inner surface of the tread and the rim and between the first and second interior walls;

a third air chamber defined within the second sidewall, the inner surface of the tread, the second interior wall, and the rim; and first, second, and third spacers positioned on the rim within the first, second, and third air chambers, respectively, and extending circumferentially around the rim, wherein the first, second, and third spacers maintain a spacing between the first sidewall, the first interior wall, the second interior wall, and the second sidewall, and wherein the first, second, and third spacers each comprise a split ring.

* * * * *